Sept. 12, 1967  R. A. KELLY  3,341,768
ALTERNATOR PHASE VOLTAGE REGULATOR
Filed March 10, 1967

INVENTOR
ROBERT A. KELLY
BY
Kane, Dalsimer, Kane, Sullivan + Smith
ATTORNEYS

United States Patent Office 3,341,768
Patented Sept. 12, 1967

3,341,768
ALTERNATOR PHASE VOLTAGE REGULATOR
Robert A. Kelly, 78—52 74th St., Glendale,
New York, N.Y. 11227
Filed Mar. 10, 1967, Ser. No. 622,190
7 Claims. (Cl. 322—24)

ABSTRACT OF THE DISCLOSURE

A regulating means for a polyphase alternator to regulate the output of each phase individually as part of an integrated system.

Cross reference to related application

This application is a continuation-in-part of my copending application Serial No. 316,906 filed October 17, 1963, now abandoned, entitled "Alternator Phase Voltage Regulator."

Background of the invention

In most present day polyphase alternators the output voltage is regulated by an apparatus that senses one of the phase voltages or line voltages and feeds back into the alternator's field a direct current modulated to maintain that particular output voltage constant. The apparatus maintains a constant output voltage on the phase to which it is connected. If the load is equally distributed on all phases, all output voltages will be maintained constant and equal because of the symmetry of the alternator and load but not as a result of the action of the regulator which is actually regulating one phase only. For example, as shown in FIG. 1, three phase alternator 3 of the usual type is driven by prime mover 1, to which it is provided with mechanical coupling 2. In order to provide a stable output, alternator 3 is provided with an automatic voltage regulator 6. The regulator 6 is connected to the output leads of the alternator by leads 7 and 8 and is arranged to measure one phase voltage as shown by the solid lines, or one line voltage as shown by the dotted and solid lines in FIG. 1. Regulator 6 in turn regulates the D.C. exciter 5, by means of connections 9 and 10. The exciter 5 is mechanically coupled to the alternator 3 by means of shaft 4 and furnishes exciting or field current to the alternator by means of connections 11 and 12. Should the line (or phase) voltage drop due to load on the alternator, the automatic regulator senses this drop and regulates the exciter so as to produce more field current thereby increasing the output voltage of the alternator to its original level. In some cases, the output current of one phase may be sensed by the regulator in addition to the output voltage to provide even better regulation or a rising alternator voltage characteristic.

Alternators in which the field current is adjusted manually exhibit what is considered poor voltage regulation, usually on the order of 20 to 30 percent. With an automatic voltage regulator, this regulation can be 1 percent or less. It can be seen however in FIG. 1 that should all the load be placed on one phase or line, such as phase A, the drop in output voltage will not be sensed by the regulator since it is not connected to that phase. In such a case, the voltage regulation on that phase would be 20 to 30 percent which is quite undesirable.

To overcome this condition, which can be caused by any unbalanced load, other regulators have been developed which sense all phase voltages, average them by some means or other, and regulate the alternator output accordingly.

Another means of overcoming this drawback is to provide the alternator rotor with amortisseur windings, which suppress any variation in the field flux produced by unequal stator currents. An unbalanced load can be considered as the sum of a single phase load plus a balanced polyphase load. The single phase load can be shown to produce double frequency pulsations in the pole structure which induce eddy currents. By Lenz's law, the currents induced in amortisseur windings, if such are provided, tend to suppress these flux pulsations. The voltage regulator mentioned above then compensates for the average effects of balanced polyphase load.

Summary of the invention

A regulating device for alternators without amortisseur windings wherein the output voltage of each phase of a polyphase alternator can be individually regulated with respect to the average, as part of an integrated system so as to be maintained constant under conditions of unequal load distribution on the stator windings. A supplementary regulating system consisting of detector and amplifier which permits individual regulation of the output phase voltages of a polyphase alternator. Means are provided to produce a rising voltage characteristic at the alternator to compensate for unequal transmission line voltage drop, thereby reducing the need for tap changing.

Description of the drawings

In FIG. 2 the numeral 3 indicates an alternator which has a three-phase output, these phases being indicated by the numerals 11, 12 and 13 with 11 designated phase A, 12 designated phase B and 13 designated phase C. A detector is shown indicated by the numeral 14 and is connected to measure current in phase A by connection 15 with line 11, phase B by connection 16 with line 12, and phase C by connection 17 with line 13. The output of the detector is fed into variable gain A.C. amplifier 18 and the feed connection is indicated by the numeral 19 in FIG. 2. The combined amplifier and detector is indicated by the numeral 20 and represents the alternator phase voltage regulator which is the subject of this invention. The output of the phase voltage regulator is applied to the field winding of the alternator 3 by connection 21, connections 22 and 23 being the connections between the exciter 24 and the field winding of the alternator. The rotor of alternator 3 and the rotor of detector 14 are mechanically linked so that they turn at the same rate.

The amplifier 18 provides the correct amount of double frequency and harmonic current to balance output the effect of armature reaction caused by unbalanced load currents in the stator of the alternator. The A.C. amplifier 18 also serves to isolate the direct current from the exciter 24 from the field winding of the detector 14.

Figure 1:
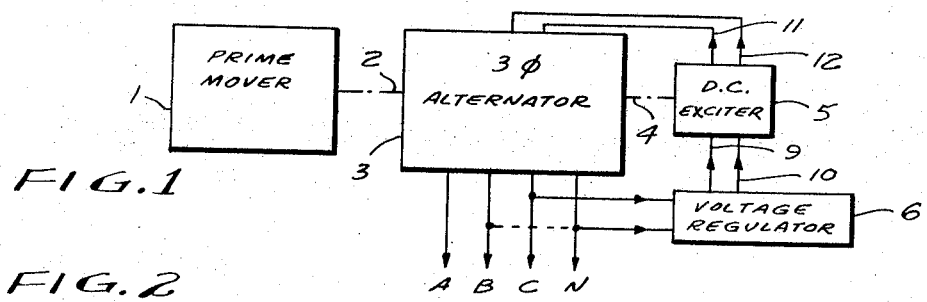
FIG. 1 is a diagrammatic representation of a polyphase alternator regulated in accordance with the prior art.
Figure 2:
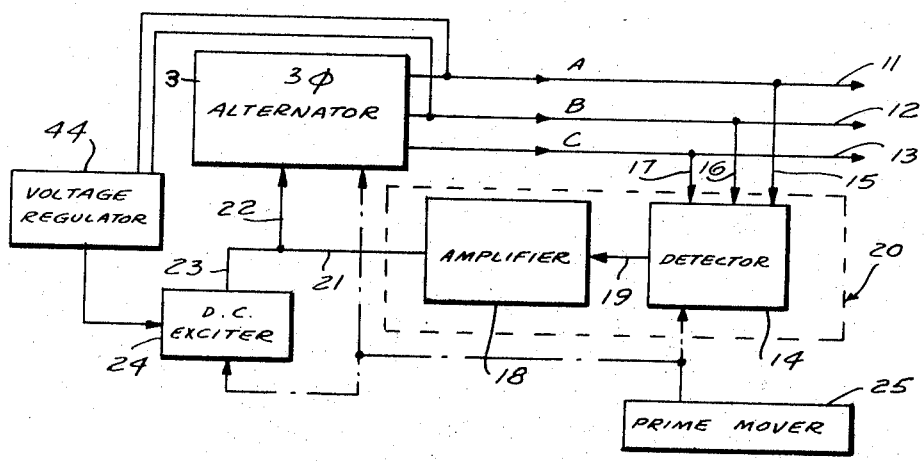
FIG. 2 is a diagrammatic showing of an alternator phase voltage regulator system employing the teachings of this invention.
Figure 3:
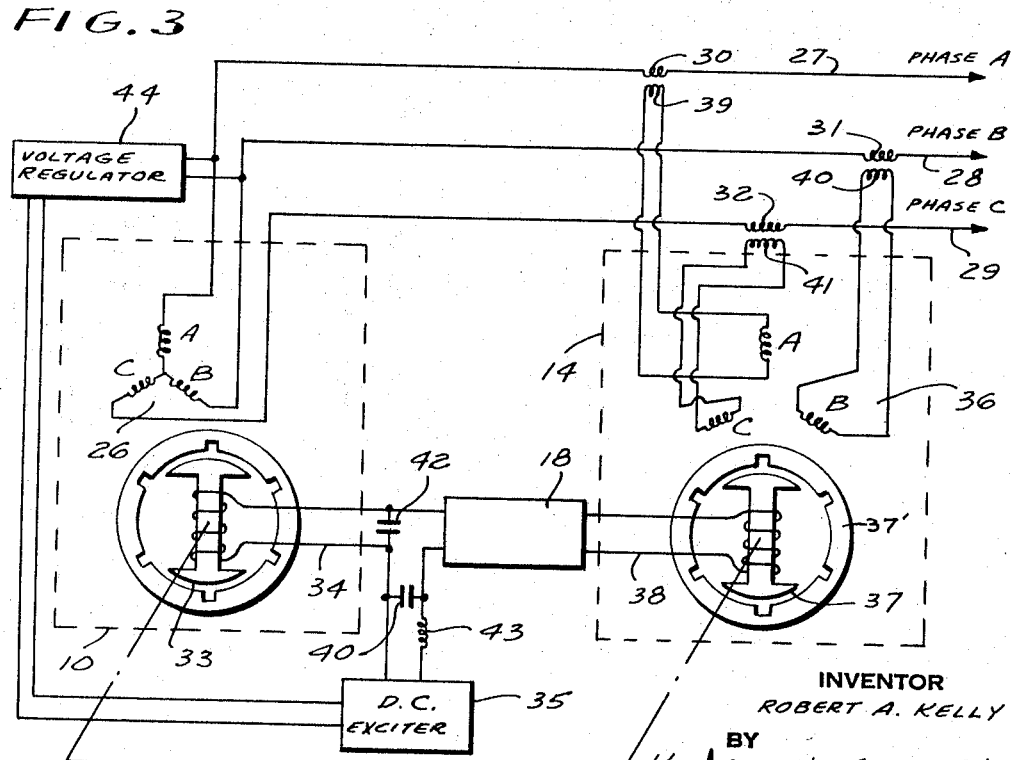
FIG. 3 is an electrical schematic of a three phase generating system with a phase voltage regulator of the type shown in FIG. 2.

As seen in FIG. 3 the generating system which is illustrated by way of example to describe the invention, consists in part of a three-phase alternator having a Y connected stator 26. The three phases are marked A, B and C, with phase A taken off on lead 27, phase B taken off on lead 28, and phase C taken off on lead 29. Leads 27, 28 and 29 are each in series with the primary of a respective current transformer indicated by the numerals 30, 31 and 32, respectively. The rotor of the alternator is indicated by the numeral 33 and has a field winding 34 excited by D.C. exciter 35 of the usual design. The exciter in turn is controlled by a typical automatic voltage regulator 44 which serves the output voltage of the alternator.

The subject invention supplements the regulator 44 and provides amplifier 18 and detector 14 in combination. The detector has a magnetic circuit comprised of rotor 37 and a stator 37'. Mounted on the rotor is a field winding whose terminals are brought out by means of slip rings. Mounted on the stator is a three-phase winding 36 of which the terminals of each phase winding are brought out separately. The detector stator is further provided with means to adjust its axial orientation with respect to the rotor. The detector portion of the invention is preferably magnetically similar to the alternator which it will regulate. As shown in FIG. 3, the detector's phase windings are labeled A, B and C corresponding to the phases of the alternator. The rotor 37 is mechanically coupled to the rotor 33 of the alternator and is provided with field winding 38. The field winding 38 is coupled to the field winding 34 of the alternator through variable gain A.C. amplifier 18. Each of the phases of the stator of the detector is coupled to the respective phase of the alternator through a current transformer, polarity being preserved. Hence, phase A of the detector is coupled to secondary 39 which is electromagnetically coupled to primary 30 in line 27 or phase A, secondary 40 couples phase B of the detector to line 28 or phase B of the alternator by electromagnetic coupling with primary 31 and phase C of the detector is coupled through secondary 41 to primary 32 and lead 29 or phase C of the alternator system.

The current transformers which are the combinations of windings 30 and 39, windings 31 and 40 and windings 32 and 41 respectively are required if the stator windings of the detector are designed to carry less than the maximum load current of the alternator.

Detector 14 in the figures is shown as a two-pole unit so that it can be directly connected to the shaft of the two-pole alternator 10.

Amplifier 18 is a conventional variable gain alternating current amplifying device capable of reproducing faithfully in the required magnitude the double frequency current with any harmonics produced by the detector rotor winding. The input and output impedances are determined from the unbalanced loads expected or in accordance with the unbalance load limits one may wish to establish for the alternator in conjunction with the impedances of the respective field windings. The power output capability likewise is dependent upon the unbalanced loads which may be tolerated and the size of the alternator to be regulated. Its rating will usually be the unbalanced load limit expressed as a percent of the alternator rating, times the rating of the exciter.

If the currents flowing in lines 27, 28 and 29 are not identical, that is, unequal in magnitude or of different phase angles to their respective phase voltages, the total flux in the magnetic circuit of the detector will vary from instant to instant as the detector's rotor rotates. For example, the phase wire carrying a larger current will create a larger MMF in the detector's magnetic circuit. Since the reluctance of the detector's magnetic circuit is constant, the MMF as it varies from instant to instant will produce a corresponding varying flux.

This varying flux will induce a current in the detector field windings 38. By means of amplifier 18 this current is increased to the proper value and causes an alternating current to flow in field 34. This alternating current will be superimposed on the direct current in field 34 from the exciter 35. When the detector stator windings have been mechanically adjusted to the proper fixed axial position with relation to the detector rotor winding, that is, to match the alternator stator-rotor winding relationship, the current generated in the detector field winding will cause a proportionate current to flow in the alternator field windings, creating a MMF equal and opposite to the MMF created by the unbalanced load current in the alternator stator windings. That is, when the load current unbalance in the alternator stator windings tends to demagnetize the alternator field at a given instant in its rotation, the phase voltage regulator will furnish additional field current at that instant to maintain the total instantaneous alternator field flux constant. The current produced by the regulator supplements the current produced by the D.C. exciter from instant to instant in order to maintain the total MMF in the alternator magnetic circuit constant as the alternator field rotates under each different phase winding of its stator. The current produced by the varying flux in the detector necessarily changes the field current in the alternator to cancel out the undesired effect of the unbalanced load current, which is to change the voltage generated in a particular phase of the alternator. The end result is that the instantaneous phase voltages of the alternator are individually regulated according to the unbalanced load current (which produces unbalanced output voltages). The exciter and its regulator control serves to regulate the nominal output voltage by sensing one phase (or line) voltage and therefore cannot produce any individual regulating effect on the other phases.

Conversely, the invention does not sense output voltage and could not correct low voltage output of an alternator resulting from balanced load currents.

The device which is the subject of this invention will regulate the voltage generated in each phase of the alternator according to the differences between the output (or load) currents of the respective phases. If the demagnetizing effect of current in the alternator stator windings is constant upon the alternator's rotor as it rotates, the automatic regulator and direct current exciter combination will increase the direct current component of the alternator field current to cancel it out, thereby maintaining the output voltage at the desired level. If the demagnetizing effect of current in the stator windings is not constant upon the alternator's rotor as it rotates, this same non-constancy will be created in the magnetic circuit of the detector. This nonconstancy in the detector will induce a current in its field winding which, after proper amplification, produces a corresponding current in the alternator field winding causing the original nonconstancy in the alternator field flux to be cancelled out.

Inasmuch as a constant flux has been achieved in the alternator throughout the rotation of its rotor, the voltage induced in each alternator stator winding 36 will be identical accomplishing the objective to be achieved by the invention.

As explained previously, balanced load currents create a rotating magnetic field in the stator of the detector. The strength of this field varies according to the magnitude of load current. In applications where a significant load current will always be flowing, the mechanical coupling between the rotors of the detector and the alternator can be eliminated if the reluctance of the detector rotor's magnetic circuit is less through its poles than through the interpolar space. In such case, the rotating magnetic field established by the detector's stator windings will pull its rotor into synchronism or synchronous rotation. Operation of the phase voltage regulator with the detector uncoupled from the alternator rotor and with proper adjustment through the amplifier will be satisfactory only for a given power factor of the balanced portion of the load. In such an uncoupled state, variations in balanced load power factor will cause a phase shift and a change in the relationship between the detector's and alternator's rotor windings and consequently a change in the stator-rotor-rotor-stator feedback system. Such change in the feedback system will cause a change in the magnitude of the double frequency current induced in the detector rotor winding and consequently in the alternator field winding, resulting in improper performance.

Neglecting rotation for the moment, when a pole of the alternator's rotor is aligned with the center of a stator phase winding, a transformer is created by virtue of the magnetic coupling and the turns in the stator and field windings. The same holds true for the detector. By virtue of the connections between the respective stators and rotors, a feedback loop is created whereby a change in current flow in one phase winding of the alternator, caused by a load, is counterbalanced by a corresponding change in current flow in its field winding, said field current being furnished by the amplifier according to current flow in the detector rotor winding, said detector rotor winding current being caused to flow by virtue of its coupling to the load lines through the magnetic circuit and turns of the detector stator windings. With proper selection of turns and ratios in the detector stator and rotor windings according to the turns and ratios in the alternator stator and rotor windings, unity gain can be attained in the feedback loop described, in which case the amplifier is largely unneeded. However, the detector windings must be capable of carrying the currents involved and a suitable device must be inserted between the rotor connections to prevent the flow of direct current in the detector rotor winding.

When the phase voltage regulator is put into operation in an overcompensating state, the unbalanced load current will cause an excess of compensating current to flow in the alternator rotor winding, thereby creating a greater flux and a corresponding higher output voltage on the phase (or phases) furnishing the unbalance load current. This higher than normal output voltage can be utilized to compensate for the higher than normal voltage drop in the transmission line caused by the unbalanced current.

The windings on the stator of the detector spaced electrically 120° are shown in the figures as three independent windings. It is not necessary that the configuration be such. Any means for developing a rotating magnetic field in the detector's stator whose strength is a function of the relative amplitudes of the current flowing in the alternator phases is satisfactory. The means could consists—in a suitable installation—of passing the alternator output lines through a magnetizable material to create a field in the presence of the detector rotor or merely establishing the rotor in the magnetic field surrounding the load conductors of the alternator.

In FIG. 3 a coupling network is shown consisting of capacitance 40, inductance 43, which blocks A.C. current from entering the exciter 35, and capacitance 42 which compensates for the inductive load presented by the alternator field to the amplifier. The amplifier 18 prevents D.C. current from exciter 35 from entering the detector. Other suitable coupling networks may be utilized, however, it is believed that the network shown in FIG. 3 is especially effective for the purpose.

The voltage regulator is set up for operation as follows: First, the detector is connected to the shaft of the alternator so as to operate in synchronism with it. In the event the number of poles differ between the detector and alternator rotors, a suitable gear box is required to set up the proper synchronous speed. Second, the phase legs are connected to the detector directly or with current transformers as shown. A balanced load placed on the alternator should produce no current in the field winding of the detector. If a large output current is obtained resulting from counterrotation of rotor and stator flux in the detector, it is necessary to interchange two phase connections to obtain the correct polarity. (With no load no output is present.) A small output of double frequency current should be obtained from the field of the detector when a single phase resistive test load is connected to the alternator (preferably from phase to neutral). Third, the field of the detector is connected to the field of the generator by means of the A.C. amplifier. With the test load connected, the presence of the double frequency current in the alternator field winding will cause one or more phase voltages of the alternator to increase or decrease. The stator of the detector is rotated until the phase to which the test load is connected reaches a maximum or minimum. At this point the detector stator is fixed in place. If a minimum is detected, the detector field winding connections should be reversed. Fourth, the amplifier gain should be adjusted to make the output voltage of the test phase again equal to that of the other phase.

The setup of the regulator will be accomplished much more readily if the alternator D.C. field current is kept constant, either by use of a manually operated field resistance or by disabling the automatic voltage regulator usually provided.

When properly set up, the magnetic effect in the alternator field, set up by unbalanced load current, will be similar to the magnetic effect set up in the detector field. The current induced in the detector field by this magnetic effect is used to introduce an equal and opposite magnetic effect in the alternator field to cancel out the original magnetic effect which causes the alternator output voltages to differ. It should be noted that this invention will not compensate for winding impedance of the alternator or voltage drop cause by it. Since this voltage drop is usually small compared to that caused by armature reaction, the output voltages of the various phases will remain substantially the same when an unbalanced load is placed on the alternator.

Although the drawings disclose a salient pole alternator, there is also the nonsalient pole type which is constructed from a single ingot or block of steel. As such, it is subject to comparatively large iron losses and since it is not the usual transformer iron it is generally subject to larger than normal eddy current and hysteresis losses.

The effect of these losses is to decrease the efficiency of a nonsalient pole alternator and also to cause rotor heating which lowers the capacity of an alternator.

By utilization of the alternator regulator disclosed herein the total flux is kept constant in the rotor. With constant flux there are little or no eddy current and hysteresis losses in the rotor. The phase voltage regulator causes the net MMF in the magnetic path to remain constant at every point in the revolution of the rotor which results in zero flux change in the rotor.

It is also noted that inasmuch as the regulator disclosed herein detects and measures the negative phase sequence for superposition of compensating currents on the normal D.C. field current, the net effect is to create a zero or low impedance to the sequence in the alternator. The MMF created in the stator by the sequence is counterbalanced by an equal and opposite MMF induced in the rotor. The problems associated with metallic slot closers and other materials which may cause a squirrel cage effect in a rotor are thereby eliminated.

Another application of the regulator which is readily apparent is the use of the invention, either with or without the amplifier to operate devices which will disconnect an alternator from the load whenever the unbalanced load exceeds a given amount or to protect an alternator in the even of a single phase fault.

By adding a current sensitive relay, connected across the detector field winding or across the output of the amplifier, the amount of unbalanced load on the alternator could be measured and limited to either the manufacturer's recommendations or the user's wishes. In addition, the same relay could be used to trip out circuit breakers in the event of a phase to phase to phase or phase to ground short circuit.

The detector could also be built into the exciter if provided in order to eliminate the necessity of having two directly connected devices. The respective magnetic circuits would have to be separate.

Changes in the system and rearrangement of parts might be resorted to without departing from the spirit of the invention as defined by the claims.

I claim:

1. A phase voltage regulator for use in a polyphase voltage generating system of the type utilizing a prime mover, an alternator rotor, alternator poles, alternator stator windings, an alternator field winding, first means for supplying D.C. current to said alternator field winding, and regulator means for regulating said first means, said phase regulator including in combination a phase regulator magnetic field whose strength and orientation is a function of the phase angles and amplitudes of the current flowing in said alternator phases, a phase regulator rotor, means for rotating said phase regulator rotor in said phase regulator magnetic field in synchronism with said phase regulator magnetic field, a phase regulator field winding on said phase regulator rotor, an alternating current developed in said phase regulator field winding by a variation in said phase regulator magnetic field, and said phase regulator field winding being coupled to said alternator field winding whereby the current flowing in the alternator field winding is varied by the presence of said alternating current in said phase regulator field winding.

2. A phase voltage regulator in accordance with claim 1 in which said alternator rotor and said phase regulator rotor are mechanically coupled.

3. A phase voltage regulator in accordance with claim 1 in which said phase regulator field winding is coupled to said alternator field winding through a transformer.

4. A phase voltage regulator in accordance with claim 3 in which the means for coupling said phase regulator field winding to said alternator field winding is a coupling circuit including a capacitance-inductance preventing alternating current from entering the source of said D.C. alternator field current and a capacitance to compensate for inductive reactance in said alternator field winding.

5. A phase voltage regulator in accordance with claim 4 in which an amplifier is provided between said alternator field winding and said phase regulator field winding producing a rising voltage characteristic to compensate for voltage drop.

6. A phase voltage regulator in accordance with claim 1 in which there is included a polyphase stator winding of said phase regulator and means electrically coupling each phase of said phase regulator stator winding to a respective phase of said alternator stator winding.

7. A phase voltage regulator in accordance with claim 6 in which the means electrically coupling each phase of said phase regulator stator winding with the respective phase of said alternator stator winding consists of a current transformer the primary of which is in the circuit of the respective alternator stator phase winding and the secondary of which is in the respective phase regulator stator phase winding.

References Cited

UNITED STATES PATENTS

| | | | |
|---|---|---|---|
| 1,354,074 | 9/1920 | Schrage | 307—14 |
| 1,354,901 | 10/1920 | Fynn | 322—20 |
| 2,186,847 | 1/1940 | Troger | 322—25 |
| 2,414,287 | 1/1947 | Crever | 322 |
| 2,854,617 | 9/1958 | Johnson | 322—20 X |
| 2,927,263 | 3/1960 | Kall | 322—59 X |
| 3,034,035 | 5/1962 | Baumann | 322 |
| 3,200,323 | 8/1965 | Faulkes | 322—59 X |

MILTON O. HIRSHFIELD, *Primary Examiner.*

J. D. TRAMMELL, *Assistant Examiner.*